(12) United States Patent
Teplitsky

(10) Patent No.: US 6,735,179 B2
(45) Date of Patent: May 11, 2004

(54) SYSTEMS AND METHODS FOR PACKET FILTERING

(75) Inventor: Yakov Teplitsky, Cupertino, CA (US)

(73) Assignee: Bivio Networks, Inc., Pleasanton, CA (US)

( * ) Notice: Subject to any disclaimer, the term of this patent is extended or adjusted under 35 U.S.C. 154(b) by 0 days.

(21) Appl. No.: 10/076,077

(22) Filed: Feb. 14, 2002

(65) Prior Publication Data

US 2003/0161272 A1 Aug. 28, 2003

(51) Int. Cl.⁷ .............................................. H04L 12/26
(52) U.S. Cl. .................. 370/252; 370/392; 370/395.32; 711/216; 711/202; 713/200
(58) Field of Search ................................. 370/252, 230, 370/235, 389, 392, 395.32; 713/200; 711/202, 203, 200, 201, 205, 216, 221

(56) References Cited

U.S. PATENT DOCUMENTS 5,950,195 A    9/1999  Stockwell et al. ............. 707/4
6,341,309 B1 * 1/2002  Vaid et al. ................... 709/223
2002/0009076 A1 * 1/2002  Engbersen et al. ......... 370/389
2002/0157020 A1 * 10/2002  Royer ........................ 713/201

* cited by examiner

*Primary Examiner*—Alpus H. Hsu
*Assistant Examiner*—Michael J Molinari
(74) *Attorney, Agent, or Firm*—Heller Ehrman White & McAuliffe LLP

(57) ABSTRACT

Systems and methods are described for converting priority based rules into isomorphic longest match rules. Rules for packet processing may be presented to a networking device in priority order, through an interface such as a Command Line Interface (CLI) or from networking applications which may reside on the networking device. The networking device may include hardware and/or software layers for accelerating packet processing; a forwarding layer may include hardware and/or software designed to perform longest match searches on packets. Prioritized rules may be converted into a data structure for the forwarding layer, so that a longest match search performed by the forwarding layer on the data structure is equivalent to a priority order search on the prioritized rules.

28 Claims, 2 Drawing Sheets

SYSTEMS AND METHODS FOR PACKET FILTERING

FIELD OF THE INVENTION

The invention relates to the field of data networking. In particular, the invention relates to technologies for packet and flow identification in networks.

DESCRIPTION OF THE RELATED ART

Longest match searches are a ubiquitous feature in data networking technology, particularly for packet routing. For instance, in IP routing, a destination address for a given packet is matched against a routing table; amongst the multiple entries that match the destination address, the router picks the entry which has the longest subnet mask.

Given the prevalence of the longest prefix matching techniques, routing and packet processing hardware are typically implemented to support such algorithms. However, it may be desirable to match packets against additional parameters in a table by use of techniques other than longest match. For instance, network firewalls typically identify and filter packets based on numerous parameters in the packet headers. Moreover, rules that are implemented by firewalls for packet filtering are typically inserted through an interface such as a Command Line Interface, or CLI. Rules are typically presented to such interfaces in priority order, wherein the order of priority—rather than the length of a pattern match—dictates which rule is matched to the packet.

It may be desirable to accelerate packet processing devices such as a network firewall by use of hardware which implement longest match searches; however, such a device should be able to accept rules which are presented in priority order. As such, there is a need for technology to convert priority-based rules into equivalent rules suitable for a longest match search.

Another difficulty with prior art packet processing technologies is the rigidity and inflexibility, which precludes the use of such technology for general purpose packet matching. Fast packet processing is typically achieved by the use of dedicated hardware. Some routers, for instance, include customized ASICs for packet processing; as these ASICs are dedicated to specific networking tasks, they cannot be reprogrammed to search for different types of patterns in packets. Recent years have witnessed the introduction of programmable network processors. These network processors are limited in their programmability, however, as their data structures are generally fixed in size and are dedicated to specific types of searches on packets, such as longest matches on specific networking parameters. As such, there is a need to implement new types of data structures in network processors which allow searches on arbitrarily many networking parameters of different lengths.

SUMMARY OF THE INVENTION

The invention includes systems and methods for converting priority based rules into isomorphic longest match rules. In some embodiments of the invention, rules for packet processing are presented to a networking device in priority order. These rules may be presented to the networking device through an interface such as a Command Line Interface, or CLI. Alternatively, the rules may be presented by one or more software applications; these software applications may, in some embodiments, reside at least partially on the networking device itself.

In some embodiments of the invention, the networking device includes a hardware and/or software layer, referred to as a forwarding layer, for accelerating packet processing; the forwarding layer includes hardware and/or software designed to perform longest match searches on packets. The prioritized rules are converted into a data structure for the forwarding layer, which may include one or more longest match trees; this transformation ensures that for any given packet entering the networking device, a longest match search performed by the forwarding layer on the data structure is equivalent to a priority order search on the prioritized rules.

These and other embodiments are described in greater detail infra.

DETAILED DESCRIPTION

The embodiments and examples described herein are intended for illustrative purposes only; alternative embodiments shall be apparent to those skilled in the art.

A. Networking Environment

Figure 1:
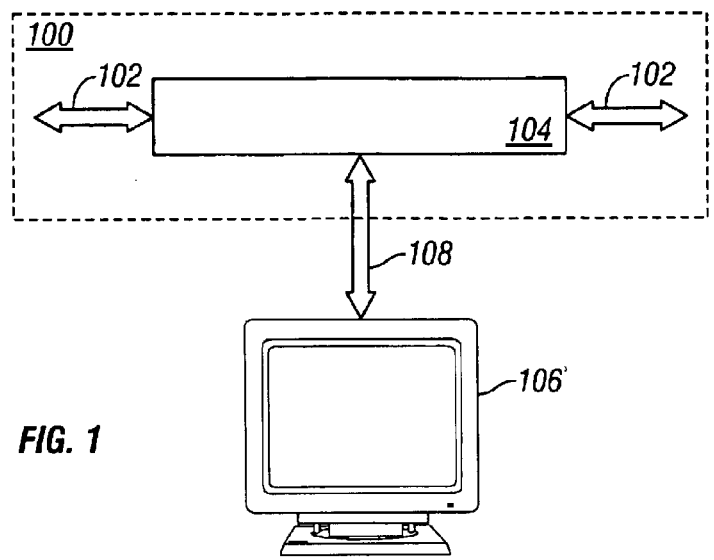
FIG. 1 schematically illustrates a forwarding layer of a networking device according to embodiments of the invention.

A networking environment relevant to the invention is illustrated schematically in FIG. 1. The environment includes a Networking Device 100 which includes one or more external interfaces 102 for transmitting data. The Networking Device 100 includes a forwarding layer 104 for inspecting packets traversing the Networking Device via the external interfaces 102. The forwarding layer may incorporate one or more ASICs, Network Processors including firmware, or general purpose CPUs with specified packet-forwarding software. In embodiments incorporating Network Processors, examples of suitable Network Processors include the Intel® IXP Chip, the Agere family of Network Processors, or Motorola Inc.'s C-Port network processor; other suitable network processors will be apparent to those skilled in the art. Network processors available as of the time of this writing may operate at rates of OC-48, OC-192, or OC-768. In a non-limiting embodiment, the Networking Device 100 may be a programmable networking device, as described in U.S. applications Ser. No. 09/679,321, filed Oct. 3, 2000, inventors Junaid Islam, Hoamyoun Valizadeh, and Jeffery S. Payne, and U.S. Pat. No. 09/918,363, filed Jul. 30, 2001, inventors Junaid Islam, Hoamyoun Valizadeh, and Jeffery S. Payne, which are hereby incorporated by reference in their entirety.

The Networking Device also includes a user space environment 106 enabling system administrators to control and interact with the device 100. The user space environment 106 typically includes a Command Line Interface, or CLI, and may communicate with the networking device 100 via a management port 108. The CLI includes instructions allowing the user to specify instructions to the forwarding layer 104 for packet handling.

Figure 2:
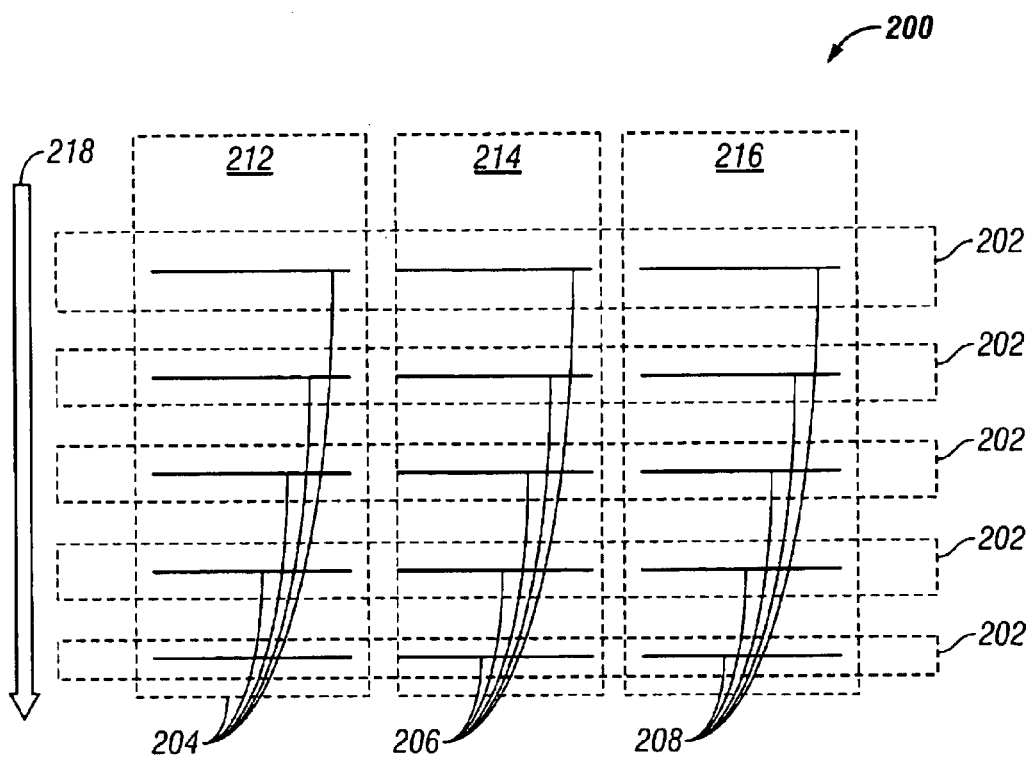
FIG. 2 illustrates a Command Line Interface used by embodiments of the invention.

FIG. 2 illustrates a typical set of commands entered into Command Line Interface for a Networking Device. In this example, a series of prioritized rules 200 are presented to the networking device 100 via the CLI; these rules are presented in order of priority, such that when a packet arrives at the Networking Device from an external interface, the headers of the packet are matched against the rules in the order of priority. When a rule is found that matches the packet, actions specified in the rule are taken for that packet. In a non-limiting embodiment, the rules may be presented in descending order of priority 218. Alternatively, the rules may be presented in increasing order of priority; other arrangements for prioritizing rules shall be apparent to those skilled in the art.

B. Longest Match Trees

Figure 3:
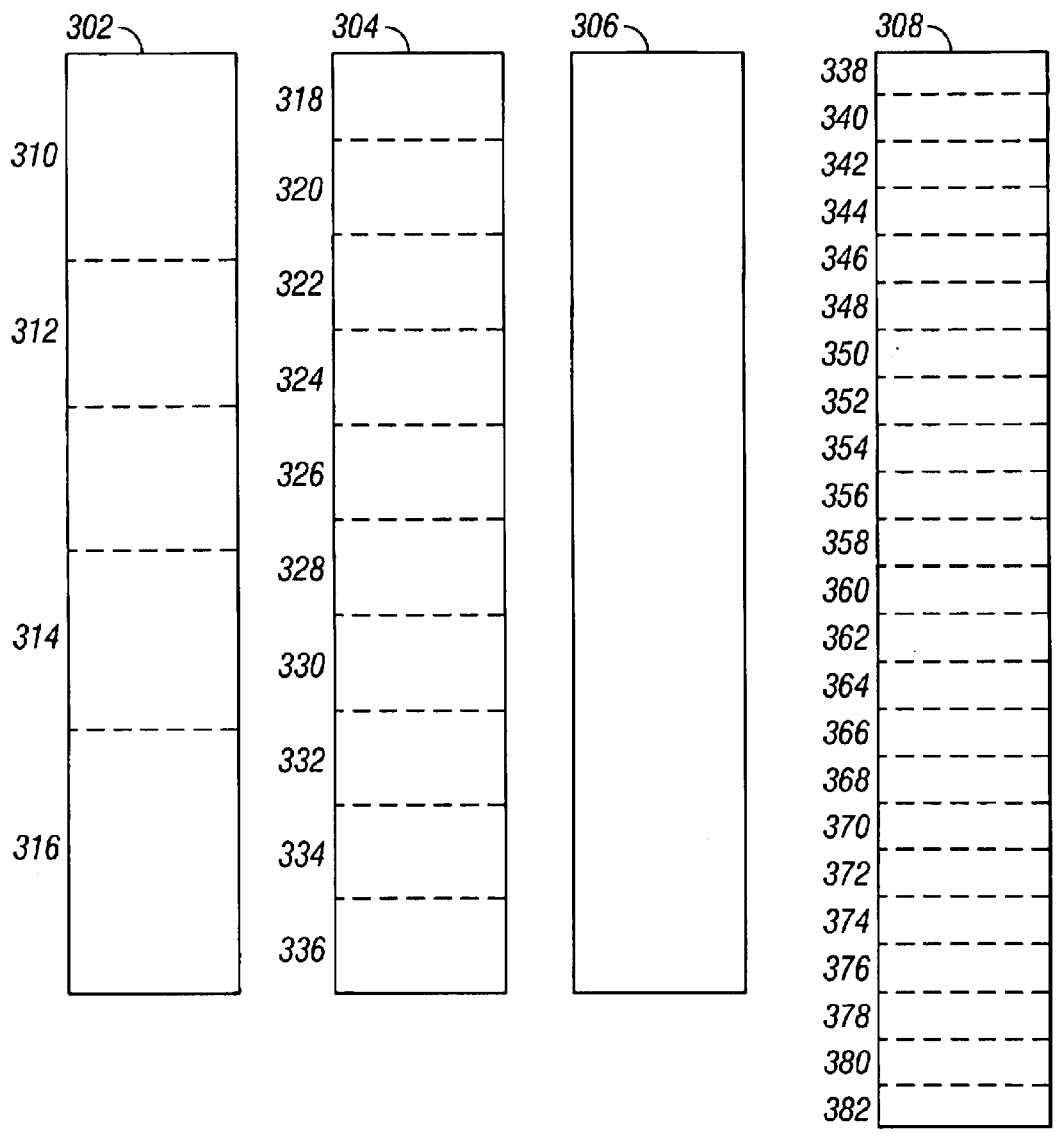
FIG. 3 illustrates a data structure for matching packets to arbitrary rules according to an embodiment of the invention.

In embodiments of the invention, the forwarding layer 104 may search for matches in the packet headers by use of a longest match search on a Longest Match Tree; longest match searches are well known in the art. A non-limiting example of Longest Match Tree 300 is illustrated in FIG. 3. The Longest Match Tree may include subtrees, or filters 302 304 306 308, which may have different widths; in the illustrated embodiment 300, the subtrees 302 304 306 308 are of four different widths. When a packet arrives at the forwarding layer 104, the headers are retrieved from the packet and are matched against the Longest Match Tree 300 by use of a longest match search.

In embodiments of the invention, each filter Filter 0 300 Filter 1 302 Filter 2 304 Filter 3 306 may handle fields of a different size. As an illustrative, non-limiting example, suppose the forwarding layer 104 processes TCP/IP packets, and that Filter 0 300 has a width of 0–1 bytes. Then those fields in TCP/IP which have a width of 0–1 bytes may be searched within it. For instance, these fields in the IP Header may include Type of Service (TOS), 8-bit Protocol, 8-bit time to live (TTL). Filter 1 302 may have a width of 1–2 bytes, sufficient for fields such as IP Source Port and Destination Port. Filter 2 304 has a width of 2–3 bytes. Filter 3 306, which has a width of 3–4 bytes, can accommodate fields such as TCP Source IP Address and Destination IP Address.

C. Conversion of Prioritized Rules for Longest Match Searches

1. Form of Prioritized Rules

Embodiments of the invention include mechanisms for converting prioritized rules 202 presented in a Rule Database 200 as illustrated in FIG. 2 200 into an equivalent rules suitable for a longest match search; in some embodiments of the invention, the equivalent rules are used to populate a longest match tree 300, which is then searched by the forwarding layer 104. Each rule 202 in the Rule Database 200 includes one or more values 204 206 208 for one or more corresponding fields 212 214 216. In embodiments of the invention, the fields 212 214 216 may correspond to various parameters in TCP and IP headers, and the values 204 206 208 may be possible values of these TCP/IP parameters. As an example, the fields 212 214 216 may correspond, respectively, to the TCP/IP parameters of 'Source Address,' 'Destination Address,' and 'Port Number,' while the respective values 204 206 208 may be any arbitrary values addresses or port numbers, such as, respectively, '180.33.22.11', '20.10.80.68', '8080'.

In some embodiments of the invention, a value in a field may include a bit mask: for instance, a field 212 may be Source IP Address, and a value 204 for the Source IP address in a rule may be 180.55.x.x, wherein the x.x is a bit mask, indicating that the value matches to any packet with a Source IP Address containing 180.55 in its first 64 bits.

Given any two values in a field where a first value is a proper subset of the second value (or equivalently, the second value is a proper superset of the first value) a longest match search on the field will return the subset. To illustrate, suppose we perform a longest match search on the field Source IP Address 212, which contains the values 180.55.x.x 204 and 180.55.33.22 218, corresponding, respectively, to rule 1 and rule 2. As discussed above, 180.55.33.22 is a special case of 180.55.x.x; thus, the value 180.55.33.22 is a subset of the superset 180.55.x.x, and a longest match search for the address will accordingly return rule 2.

2. Use of Virtual Trees for Longest Match Searches

Embodiments of the invention supplement the Longest Match Tree 300 with Virtual Trees; each of the filters 300 302 304 306 may include one or more Virtual Trees, and each Virtual Tree may be identified by a distinct Virtual Tree Number. In some embodiments of the invention, each Virtual Tree corresponds to a distinct field 212 214 216 in the Rules Database 200, and contains multiple possible values 204 206 208 for the field; the virtual tree then acts as a C-style case statement.

To illustrate the deployment of Virtual Trees in the Longest Match Tree 300, consider the following non-limiting example. Suppose the forwarding layer 104 handles TCP/IP packets. Virtual trees 310 312 314 316 in Filter 0 302 may handle fields of 0–1 bytes, such as, for example TOS or Protocol fields; thus each of the virtual trees 310 312 314 316 in Filter 0 corresponds to either TOS or IP Protocol, and stores one or more values for the respective field. Filter 1 304 may handle field of 1–2 bytes in length, such as Source Port or Destination Port; in the example, Filter 1 304 includes virtual trees 318–336, each of which corresponds to Source Port or Destination Port, and includes one or more values for the corresponding field; Filter 2 306 supports virtual trees for fields of width 2–3 bytes; in this example, no such fields are searched. Filter 3 308 may handle virtual trees for fields of length 3–4 bytes, such as Source IP Address and Destination IP Address; in the example, Filter 3 306 includes virtual trees containing values for either the Source IP Address or the Destination IP Address.

When a packet arrives at the forwarding layer 104, a longest match search of the headers of the packet is performed against the Longest Match Tree (LMT) 300. If a value in the LMT is matched, then a corresponding action is taken. To elaborate, each entry in each virtual tree in the LMT 300 includes a value and a corresponding action. The action may be to search another parameter in the packet header. Alternatively, the action may be a particular type of operation on the packet; such an operation may, by way of non-limiting example, may be to forward the packet according to instructions, or to transform or alter the packet according to specified instructions.

3. Populating the Virtual Trees

Embodiments of the invention include algorithms to convert the prioritized rules in the Rules Database 200 to populate Virtual Trees in the Longest Match Tree 300. This ensures that for any given packet entering the forwarding layer 104, longest match searches on the Longest Match Tree 300 produce isomorphic results to a search through the prioritized Rules Database.

In some embodiments of the invention, the Rules Database 200 may be converted to a set of rules which are isomorphic under a longest match search. By way of non-limiting example, the algorithm presented in pseudo-code below may be used by some embodiments of the invention to perform this transformation:

```
Find first field/column;
choose unique VTN;
record first field and VTN
buld_graph(VTN=0, DB = all_rules, next_column);
buld_graph(VTN, DB, next_column) {
    For each value/row in the column {
        If there is a lower priority rule such that the
        current value is a superset of the corresponding
        value for the lower priority rule, then
            Insert a new rule, immediately above the
            current rule in priority, such that the new
            rule includes the corresponding value (i.e.,
            the subset)as the value for the current
            field--the remainder of the rule remains
            identical
        If there is a higher priority rule such that the
        current value is asuperset of the corresponding
        value for the higher priority rule, then
            Insert a new rule, immediately above the
            current rule in priority, such that the new
            rule includes the corresponding value (i.e.,
            the subset)as the value for the current
            field--the remainder of the rule remains
            identical
    }
    remove redundant rules;
    for each distinct value_0 of the column {
        new DB = subset of DB where value = value_0;
        remove the column from new_DB;
        Find next field/column;
        if next_field != NULL, {
            store field offset, VTN and size of the
            field
            build_graph(new_DB, news_VTN, next_column);
        }
        else
            store action;
    }
}
```

By employing the algorithm described above—or equivalents or variants thereof—to populate the data structure 300, the longest match search performed on the LMT 300 will be isomorphic to the priority-ordered rules used to generate the LMT 300. Note that the algorithm presented above is for illustrative purposes only; many equivalents and variants shall be apparent to those skilled in the art.

D. Illustration of Rule Conversion Techniques

The techniques for converting prioritized rules into Longest Match Trees are illustrated herein by use of examples. By way of non-limiting example, suppose we have the following rules presented to the networking device via in descending order of priority:

| Rule # | Source IP  | Dest IP  | Port # | Action |
|--------|------------|----------|--------|--------|
| 1      | 180.55.x.x | 1.1.1.1  | x      | A      |
| 2      | 180.55.44.33 | 1.1.x.x | x    | B      |
| 3      | 180.55.x.x | x.x.x.x  | 80     | C      |
| 4      | x.x.x.x    | x.x.x.x  | x      | D      |

The operation of the algorithm described above upon the prioritized rules produces the following results:

| Src IP | Dest IP | Port | Act | Ptr |
|--------|---------|------|-----|-----|
| | | | | | vtn = 0, field = Src IP, LMT = 0:

| Src IP | Dest IP | Port | Act | Ptr |
|--------|---------|------|------|-----|
| 180.55.44.33 | 1.1.1.1 | x | A | vtn = 1, field = IP Dest, LMT = 0 |
| 180.55.x.x | 1.1.1.1 | x | A | vtn = 2, field = IP Dest, LMT = 0 |
| 180.55.44.33 | 1.1.x.x | x | B | vtn = 1, field = IP Dest, LMT = 0 |
| 180.55.44.33 | x.x.x.x | 80 | C | vtn = 1, field = IP Dest, LMT = 0 |
| 180.55.x.x | x.x.x.x | 80 | C | vtn = 2, field = IP Dest, LMT = 0 |
| 180.55.44.33 | x.x.x.x | x | D | vtn = 1, field = IP Dest, LMT = 0 |
| 180.55.x.x | x.x.x.x | x | D | vtn = 2, field = IP Dest, LMT = 0 |
| x.x.x.x | x.x.x.x | x | D | vtn = 3, field = IP Dest, LMT = 0 |

| Dest IP | Port | Act | Ptr |
|---------|------|-----|-----| vtn = 1, field = IP Dest, LMT = 0:

| Dest IP | Port | Act | Ptr |
|---------|------|-----|-----|
| 1.1.1.1 | x | A | ACTION A |
| 1.1.1.1 | x | B | ACTION A |
| 1.1.x.x | x | B | ACTION B |
| 1.1.x.x | 80 | C | ACTION B |
| 1.1.1.1 | 80 | C | ACTION A |
| x.x.x.x | 80 | C | |
| 1.1.x.x | x | D | ACTION B |
| 1.1.1.1 | x | D | ACTION A |
| x.x.x.x | x | D | vtn = 0, field = PORT, LMT = 1 | vtn = 2, field = IP Dest, LMT = 0:

| 1.1.1.1 | x | A | ACTION A |
| 1.1.1.1 | 80 | C | ACTION A |
| x.x.x.x | 80 | C | vtn = 1, field = PORT, LMT = 1 |
| 1.1.1.1 | x | D | ACTION A |
| x.x.x.x | x | D | vtn = 1, field = PORT, LMT = 1 | vtn = 3, field IP Dest, LMT = 0:

| x.x.x.x | x | D | ACTION D |

| Port | Act | Ptr |
|------|-----|-----| vtn = 0, field = PORT, LMT = 1:

| 80 | C | ACTION C |
| 80 | D | ACTION D |
| x.x.x.x | D | ACTION D | vtn = 1, field = PORT, LMT = 1:

| 80 | C | ACTION C |
| 80 | D | ACTION C |
| x.x.x.x | D | ACTION D |

E. Alternative Embodiments

In some embodiments, the Rules Database 200 may be accessed and manipulated by applications residing on the programmable network device, or solfware applications which may be outside the device. These rules may be manipulated and downloaded to the forwarding layer in real-time.

The embodiments described above are for illustrative purposes only. Many equivalents and variants will be apparent to those skilled in the art.

What is claimed is:

1. A method of classifying network traffic comprising:

loading a set of prioritized classification rules for classifying network traffic, wherein the set of prioritized rules is listed in a priority ordering, and the set of prioritized rules includes a plurality of values, each of the plurality of values corresponding to a parameter used to identify packets;

populating one or more longest match trees, populating the one or more longest match trees including inserting a plurality of virtual trees in the one or more longest match trees, each virtual tree of the plurality of virtual trees corresponding to a value from the plurality of values, wherein each virtual tree includes one or more entries, the one or more entries including the value, and a pointer, the pointer pointing to one of another virtual tree and an instruction;

such that longest match searches performed on the one or more longest match trees are identical to prioritized searches on the set of classification rules;

wherein each of the longest match trees is of a distinct width;

wherein the one or more longest match trees includes a first longest match tree, such that the distinct width of the first longest match tree is one byte.

2. The method of claim 1, wherein the one or more longest match trees includes a second longest match tree, such that the distinct width of the second longest match tree is two bytes.

3. The method of claim 2, wherein the one or more longest match trees includes a third longest match tree, such that the distinct width of the third longest match tree is three bytes.

4. The method of claim 3, wherein the one or more longest match trees includes a fourth longest match tree, such that the distinct width of the fourth longest match tree is four bytes.

5. The method of claim 1, wherein the parameter is from a TCP/IP header.

6. The method of claim 1, wherein the parameter is from an Ethernet header.

7. The method of claim 1, further comprising: prior to loading the set of prioritized rules, receiving the set of prioritized rules from a command line interface.

8. The method of claim 1, further comprising: prior to loading the set of prioritized rules, receiving the set of prioritized rules from a networking application, wherein the networking application manipulates network traffic.

9. The method of claim 1, further comprising: after loading the set of prioritized rules, searching the set of prioritized rules for redundancy.

10. The method of claim 9, further comprising: eliminating one or more redundant rules from the set of prioritized rules.

11. The method of claim 1, wherein the instruction is to block a packet stream.

12. The method of claim 1, wherein the instruction is to rate-limit a packet stream specified by the plurality of rules.

13. The method of claim 1, wherein the instruction is to encrypt a packet stream specified by the plurality of rules.

14. In a forwarding layer of a networking device, a data structure for storing a plurality of longest match rules, the plurality of longest match rules including a plurality of values, each of the plurality of values corresponding to a networking parameter, the data structure comprising:

one or more longest match trees;

a plurality of virtual trees, such that the plurality of virtual trees is contained in the one or more longest match trees, each virtual tree of the plurality of virtual trees corresponding to a value from the plurality of values, each virtual tree including one or more entries, the one or more entries further including the value, and a pointer, the pointer pointing to one of another virtual tree and an instruction;

wherein each of the one or more longest match trees has a distinct width, wherein the one or more longest match trees includes a first longest match tree, such that the distinct width of the first longest match tree is one byte.

15. The data structure of claim 14, wherein the one or more longest match trees includes a second longest match tree, such that the distinct width of the second longest match tree is two bytes.

16. The data structure of claim 15, wherein the one or more longest match trees includes a third longest match tree, such that the distinct width of the third longest match tree is three bytes.

17. The data structure of claim 16, wherein the one or more longest match trees includes a fourth longest match tree, such that the distinct width of the fourth longest match tree is four bytes.

18. The data structure of claim 14, wherein the parameter is from a TCP/IP header.

19. The data structure of claim 14, wherein the parameter is from an Ethernet header.

20. The data structure of claim 14, wherein the parameter is at least one of Type of Service, Source IP Address, Destination IP Address, MAC, Source Port, Destination Port, Time To Live.

21. The data structure of claim 14, wherein the plurality of rules at least partially includes firewall rules.

22. The data structure of claim 14, wherein the plurality of rules at least partially includes Quality of Service rules.

23. The data structure of claim 14, wherein the forwarding layer at least partially resides on an ASIC.

24. The data structure of claim 14, wherein the forwarding layer at least partially resides on one or more network processors in the networking device.

25. The data structure of claim 14, wherein the forwarding layer forwards network traffic of rates of on our about 1 Gbps, full duplex.

26. The data structure of claim 14, wherein the forwarding layer forwards network traffic of rates of on our about 2.5 Gbps, full duplex.

27. The data structure of claim 14, wherein the forwarding layer forwards network traffic of rates of on our about 10 Gbps, full duplex.

28. The data structure of claim 14, wherein the forwarding layer forwards network traffic of rates of on our about 40 Gbps, full duplex.

* * * * *